(12) United States Patent
Dick

(10) Patent No.: US 8,572,150 B1
(45) Date of Patent: Oct. 29, 2013

(54) PARAMETERIZATION OF A CORDIC ALGORITHM FOR PROVIDING A CORDIC ENGINE

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1304 days.

(21) Appl. No.: 11/973,093

(22) Filed: Oct. 5, 2007

(51) Int. Cl.
*G06F 7/38* (2006.01)

(52) U.S. Cl.
USPC .......................................................... 708/441

(58) Field of Classification Search
USPC .................................. 708/440–441, 274–276
See application file for complete search history.

(56) References Cited

U.S. PATENT DOCUMENTS

| | | | | |
|---|---|---|---|---|
| 6,480,871 | B1 * | 11/2002 | Phatak ........................... | 708/440 |
| 6,591,230 | B1 * | 7/2003 | Ding et al. ..................... | 702/189 |
| 7,082,451 | B2 * | 7/2006 | Kulkarni et al. .............. | 708/404 |
| 7,173,982 | B1 * | 2/2007 | Yang et al. ..................... | 375/329 |
| 7,185,038 | B2 * | 2/2007 | Van Wechel et al. ......... | 708/422 |
| 7,313,196 | B1 * | 12/2007 | Hall et al. ....................... | 375/296 |
| 2007/0237255 | A1 * | 10/2007 | Riccio et al. ................... | 375/295 |
| 2010/0293210 | A1 * | 11/2010 | Sima et al. ...................... | 708/209 |

OTHER PUBLICATIONS

Xilinx Inc., "CORDDIC v3.0", DS249 Product Specification, Apr. 2005.*
D. Timmermann, H. Hahn, B. J. Hosticka, and G. Schmidt, "A programmable CORDIC chip for digital signal processing applications," IEEE J. Solid-State Circuits, vol. 26, No. 9, pp. 1317-1321, Sep. 1991.*
G. Schmidt et al., "Parameter optimization of the CORDIC algorithm and implementation in a CMOS-chip," in Proc. EUSIPCO, Sep. 1986, pp. 1219-1222.*
J. Valls, M. Kuhlmann, and K. K. Parhi, "Efficient Mapping of CORDIC Algorithms on FPGA," in IEEE Workshop on Signal Processing Systems (SiPS2000), 2000, pp. 336-345.*
Ray Andraka, "A survey of CRDIC algorithms for FPGA based computers," Proceedings of the 1998 ACM/SIGDA sixth international symposium on Field programmable gate arrays, Feb. 22-24, 1998, pp. 191-200.*
A. A. J. de Lange, A. J. van der Hoeven, E. F. Deprettere, and J. Bu, "An optimal floating-point pipeline CMOS CORDIC processor," in Proc. ISCAS, 1988, pp. 2043-2047.*
H. Dawid and H. Meyr, "CORDIC algorithms and architectures," Chapter 24 in Digital Signal Processing for Multimedia Systems, K. K. Parhi and T. Nishitani, Eds., Marcel Dekker, 1999.*
Llamocca-Obregón and Agurto-Rios, "A fixed-point implementation of the expanded hyperbolic CORDIC algorithm," Latin American applied research 37, No. 1, pp. 83-91, 2007.*
Actel Corporation, "CoreCORDIC v3.0 Handbook," 2010.*

(Continued)

*Primary Examiner* — Chat Do
*Assistant Examiner* — Matthew Sandifer
(74) *Attorney, Agent, or Firm* — W. Eric Webostad; Gerald Chan

(57) ABSTRACT

Parameterization of a CORDIC algorithm for providing a CORDIC engine is described. An aspect of the invention is a method in a digital processing system for generation of the CORDIC engine. Numbers of fractional output bits for a user-defined numerical result format are obtained. The numbers of fractional output bits are for each of a plurality of output variables associated with the CORDIC algorithm. Micro-rotations associated with each of the plurality of output variables are determined responsive to the numbers of fractional output bits. Quantizations associated with each of the plurality of output variables are determined responsive at least in part to the numbers of fractional output bits.

20 Claims, 5 Drawing Sheets

---

```
                    500
OBTAIN USER-SELECTED INTEGER BIT FIELD SIZE (B_I) AND
         FRACTIONAL BIT FIELD SIZE (B_F)
                    401
                     ↓
OBTAIN USER-SELECTED COORDINATE SYSTEM AND
         MODE AND INITIALIZE VARIABLES
                    402
                     ↓
         DETERMINE NUMBER OF ITERATIONS
                 (n = B_F + 3)
                    403
                     ↓
       DETERMINE FIELD WIDTH FOR STATE VARIABLES
            (W = 2 + B_I + B_F + log_2(n))
                    404
                     ↓
       DETERMINE FRACTIONAL BIT WIDTH FOR ANGLE
              (z = B_F + log_2(n) + 2)
                    405
                     ↓
              GENERATE CORDIC ENGINE
                    406
```

(56) References Cited

OTHER PUBLICATIONS

A. M. Despain, "Very Fast Fourier Transform Algorithms for Hardware Implementation," *IEEE Trans. On Computers*, vol. 28, pp. 331-341, May 1979.

Dick, Christopher, "Cordic Architectures for FPGA Computing", Hauck, S., et al., Reconfigurable Computing: *Reconfigurable Computing: The Theory and Practice of FPGA-Based Computation (Systems on Silicon)*, Nov. 2, 2007, Chapter 25, pp. 513-537, Morgan Kaufmann Publishers.

M. D. Ercegovac and T. Lang, *Digital Arithmetic*, Morgan Kaufman Publishers, San Francisco, Sep. 15, 2004, Chapter 7, pp. 381-383 and Chapter 10, pp. 552-555.

U. Mengali and A. N. D'Andrea, *Synchronization Techniques for Digital Receivers*, Plunum Press, New York, Chapter 5, Carrier Phase Recovery with Linear Modulation, Oct. 31, 1997, pp. 201-204.

Xilinx Inc., "*System Generator for DSP Getting Started Guide*", 10.1, Mar. 2008, 93 pp., Xilinx Inc., 2100 Logic Drive, San Jose, CA.

A. A. J. De Lange, "An Optimal Floating-Point Pipeline CMOS CORDIC Processor," *IEEE Symposium on Circuits and Systems*, pp. 2043-2047, vol. 3, Jun. 1988.

J. R. Cavallaro and F. T. Luk, "Floating-Point CORDIC for Matrix Computations," *Proc. of IEEE Int. Conf. on Computer Design: VLSI in Computers and Processors*, pp. 40-42, Oct. 3-5, 1988.

D. H. Timmerman et al., "A Programmable CORDIC Chip for Digital Signal Processor Processing Applications," *IEEE J. of Solid-State Circuits*, vol. 26, No. 9, Sep. 1991, pp. 1317-1321.

A. M. Despain, "Fourier Transform computers using CORDIC Iterations," *IEEE Trans. on Computers*, vol. 23, pp. 993-1001, Oct. 1974.

W. H. Chen et al., "A Fast Computational Algorithm for the Discrete Cosine Transform," *IEEE Trans. on Communications*, vol. com-25, pp. 1004-1009, Sep. 1977.

L. W. Chang and S. W. Lee, "Systolic Arrays for the Discrete Hartley Transform," *IEEE Trans. on Signal Processing*, vol. 29, No. 11, pp. 2411-2418, Nov. 1991.

T. Y. Sung and Y. H. Hu, "Parallel VLSI Implementation of Kalman Filter," *IEEE Trans. on Aerospace and Electronic Systems*, vol. AES 23, No. 2, pp. 215-224, Mar. 1987.

Y. H. Hu. and H. E. Liao, "CALF: A CORDIC Adaptive Lattice Filter," *IEEE Trans. on Signal Processing*, vol. 40, No. 4, pp. 990-993, Apr. 1992.

Y. H. Hu, "The Quantization Effects of the CORDIC Algorithm," *IEEE Trans on Signal Processing*, vol. 40, pp. 834-844, Jul. 1992.

J. R. Cavallaro and F. T. Luk, "Cordic Arithmetic for and SVD Processor," *J. of Parallel and Distributed Computing*, vol. 5, No. 3, pp. 271-290, Jun. 1988.

C. M. Rader, "VLSI Systolic Arrays for Adaptive Nulling," *IEEE Signal Processing Magazine*, vol. 13, No. 4, pp. 29-49, Jul. 1996.

B. Haller et al., "Efficient Implementation of Rotation Operations for High Performance QRD-RLS Filtering," *Proc. Intl. Conf. on Application-Specific Systems, Architectures and Processors*, pp. 162-174, Jul. 14-16, 1997.

J. Ma et al., "Pipelined implementation of Cordic-based QRD-MVDR adaptive beamforming," *IEEE Fourth Int. Conf. on Signal Processing*, vol. 1, pp. 514-517, Oct. 12-16, 1998.

S, Y. Park and N. I. Cho, "Fixed-Point Error Analysis of CORDIC Processor Based on the Variance Propagation Formula," *IEEE Trans. Circuits and Systems*, vol. 51, No. 3, pp. 573-584, Mar. 2004.

X. Hu and S. C. Bass, "A Neglected Error Source in the CORDIC Algorithm," *IEEE Int. Symposium on Circuits and Systems*, vol. 1, pp. 766-769, May 3-6, 1993.

J. E. Volder, "The CORDIC Trigonometric Computing Technique," *IRE Trans. Electronic Computers*, vol. 3, pp. 330-334, Sep. 1959.

Phanthavong, Douang, Mentor Graphics Corp., "Designing with DSP48 Blocks Using Precision Synthesis", Jul. 11, 2005, Xcell Journal, Third Quarter, 1-5 pp., http://www.xilinx.com/publications/xcellonline/xcell_54/xc_pdf/xc_dsp48-54.pdf.

Xilinx Inc., UG070, v1.1,"Virtex-4 User Guide", Sep. 10, 2004, 408 pages, Xilinx Inc., 2100 Logic Drive, San Jose, CA.

Xilinx Inc., UG073, v2.3, "XtremeDSP for Virtex-4 FPGAs User Guide", Jul. 5, 2005, 124 pages, Xilinx Inc., 2100 Logic Drive, San Jose, CA.

Xilinx Inc., DS083,"Virtex II Pro Platform FPGAs: Complete Data Sheet", Apr. 22, 2004, 408 pages, Xilinx Inc., 2100 Logic Drive, San Jose, CA.

Xilinx Inc., DS312, Spartan-3 FPGA Family : Complete Data Sheet , Apr. 10, 2006, 228 pages, Xilinx Inc., 2100 Logic Drive, San Jose, CA.

J. S. Walther, "A Unified Algorithm for the Elementary Functions," *AFIPS Spring Joint Computer Conference*, vol. 38, pp. 379-385, May 18-20, 1971.

N. Takagi, "Redundant CORDIC Methods with a Constant Scale Factor for Sine and Cosine Computation," IEEE Trans. Computers, vol. 40, No. 9, pp. 989-995, Sep. 1991.

J. Lee, "Constant-Factor Redundant CORDIC for Angle Calculation and Rotation," *IEEE Trans. Computers*, vol. 41, No. 8, pp. 1016-1025, Aug. 1992.

H. Dawid and H. Meyer, "The Differential CORDIC Algorithm: Constant Scale Factor Redundant Implementation without Correcting Iterations," *IEEE Trans. Computers*, vol. 45, No. 3, pp. 307-317, Mar. 1996.

G. H. Haviland and A. A. Tuszinsky, "A CORDIC Arithmetic Processor Chip," *IEEE Trans. Computers*, c-29(2) Feb. 1980.

E. Deprettere, et al., "Pipelined CORDIC Architectures for Fast VLSI Filtering and Array Processing," *Proc. ICASSP'84*, vol. 9, Part 1, pp. 41.A.6.1-A.6.4.4, Mar. 1984.

X. Hu et al., "Expanding the Range of Convergence of the CORDIC Algorithm," *IEEE Trans. on Computers*, vol. 40, No. 1, pp. 13-21, Jan. 1991.

J. M. Delosme, "VLSI Implementation of Rotations in Pseudo-Euclidean Spaces," in *Proc. IEEE Int. Conf. Acoust., Speech, Signal Processing*, vol. 8, Apr. 1983, pp. 927-930 1983.

J. M. Muller, "Discrete Basis and Computation of Elementary Functions," *IEEE Trans. Computers*, vol. C-34, No. 9, pp. 857-862, Sep. 1985.

* cited by examiner

PARAMETERIZATION OF A CORDIC ALGORITHM FOR PROVIDING A CORDIC ENGINE

FIELD OF THE INVENTION

One or more aspects of the invention relate generally to integrated circuits and, more particularly, to parameterization of a CORDIC algorithm for providing a CORDIC engine.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx™ Virtex FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

FPGAs are increasingly being deployed in various types of applications that span both embedded and general purpose computing. For example, in the embedded domain, FPGAs are being used in applications that range from high-definition video coder/decoders ("codecs"), such as for H.264, through to broadband wireless infrastructure equipment, such as may be used in IEEE 802.16e and Wireless Code-Division Multiple Access ("WCDMA") applications like Third Generation ("3G") and Super-3G base stations. In the general purpose computing space, several companies have produced machines equipped with FPGA-accelerator hardware. For example, the Cray XD1 supercomputer employs a parallel arrangement of processors complemented by FPGA-based reconfigurable computing technology. Accordingly, it should be appreciated that FPGAs may be used to realize a diverse set of system functions including: memory controllers to support Double Data Rate ("DDR"), such as DDR2 for example, among other types of memory devices; multi-gigabit serial connectivity; operating embedded software; and realization of complex mathematical calculations.

With respect to complex mathematical calculations conducted by FPGAs, it is desirable to have a substantially complete set of math libraries to support various complex mathematical calculations to be carried out. There are numerous algorithmic options known for evaluating various types of math functions that may be found in a math library associated with general purpose processors and digital signal processors ("DSPs"). Math functions may be evaluated using various implementations of a COordinate Rotation DIgital Computer ("CORDIC") algorithm. As various versions of the CORDIC algorithm are well known, they are not described in unnecessary detail for purposes of clarity. A difficulty associated with implementation of a CORDIC algorithm is determining the number of iterations and quantizations to be used to obtain an output of a target quality of result ("QoR"). While it is possible to over-engineer the implementation of a CORDIC algorithm in order to ensure an acceptable QoR, this over-engineering may consume a significant amount of circuit resources.

Accordingly, it would be both desirable and useful to provide means to determine the number of iterations and quantizations associated with a CORDIC algorithm for a targeted QoR.

SUMMARY OF THE INVENTION

One or more aspects of the invention generally relate to integrated circuits and, more particularly, to parameterization of a CORDIC algorithm for providing a CORDIC engine.

An aspect of the invention is a method in a digital processing system for generation of a CORDIC engine. Numbers of fractional output bits for a user-defined numerical result format are obtained. The numbers of fractional output bits are for each of a plurality of output variables associated with a CORDIC algorithm. Micro-rotations associated with each of the plurality of output variables are determined responsive to the numbers of fractional output bits. Quantizations associated with each of the plurality of output variables are determined responsive at least in part to the numbers of fractional output bits.

Another aspect of the invention is a machine-readable medium having stored thereon information representing instructions that, when executed by a processor, cause the processor to perform operations including obtaining numbers of fractional output bits for a user-defined numerical result format. The numbers of fractional output bits are for each of a plurality of output variables associated with a CORDIC algorithm. Micro-rotations associated with each of the plurality of output variables are determined responsive to the numbers of fractional output bits. Quantizations associated with each of the plurality of output variables are determined responsive at least in part to the numbers of fractional output bits.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
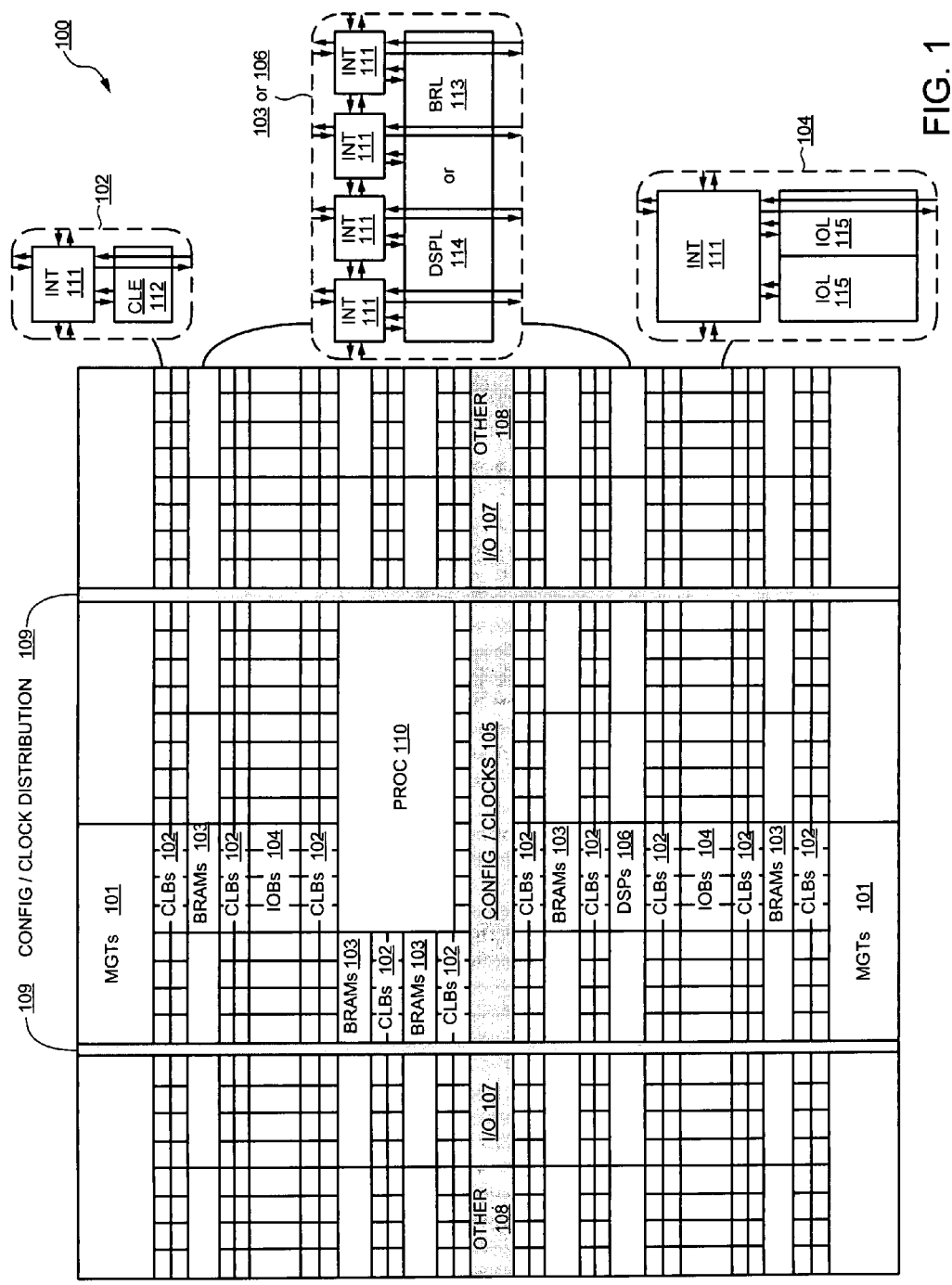
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 FPGA from Xilinx of San Jose, Calif.

Even though a Xilinx FPGA is described, it should be appreciated that other types of PLDs may be used. The following description is for implementation of a CORDIC algorithm in an FPGA as a CORDIC engine. Notably, in the following description it is assumed that the CORDIC engine is instatiated in programmable logic of the FPGA. This is because the CORDIC engine described is targeted at a QoR as determined by a user, which may vary from user to user. However, it should be appreciated that the CORDIC engine described herein may be implemented in software, where a user provides a target QoR for instantiation of the CORDIC engine in software. Furthermore, it should be appreciated that a CORDIC engine as described herein may be prototyped using an FPGA, and then converted to a hardwired application specific circuit where parametric input is reasonably predictable.

A CORDIC algorithm has two modes of operation. In one mode of operation known as vectoring or the vectoring mode, translations between Cartesian and polar coordinate systems are performed. In the other mode of operation known as rotational or the rotation mode, rotation of a plane using a series of arithmetic shifts and adds is performed. Notably, a CORDIC algorithm may be applied to a diverse set of applications for arithmetic engines, such as in Very Large-Scale Integration ("VLSI") signal processing implementations, Fast Fourier Transform ("FFT") applications, discrete cosine transform applications, discrete Hartley transform applications, Kalman filter applications, adaptive lattice structure applications, adaptive nulling applications, singular value decomposition ("SVD") applications, Given's rotation applications, and recursive lease square ("QRD-RLS") filtering applications, to name just some of the uses of a CORDIC algorithm as an arithmetic engine.

With respect to the vectoring and rotation modes, these modes may be applied to any of several coordinate systems. These coordinate systems include circular, hyperbolic, and linear coordinate systems. With respect to plane rotation of a vector $(x_s, y_s)$ through an angle $\theta$ to produce a vector $(x_f, y_f)$, a series of smaller rotations may be used rather than attempting rotations through the angle $\theta$ in one step. These series of smaller rotations or series of "micro-rotations" through a set of angles $\alpha_i$ may be expressed as $$\theta = \sum_{i=0}^{\infty} \alpha_i. \quad (1)$$

A variable $\sigma_i$ may be used to identify whether a rotation or a vectoring mode is to be used. A test on sign of the current state of an angle variable $z_i$ is as follows:

$$\sigma_i = \begin{cases} 1 & \text{if } z_i \geq 0 \\ -1 & \text{if } z_i < 0. \end{cases} \quad (2)$$

By driving $z_i$ to 0, effectively an iterative process for decomposing $\theta$ to a weighted linear combination of terms may result. As $z_i$ goes to 0, the vector $(x_0, y_0)$ effectively experiences a sequence of micro-rotations or micro-rotation extensions, that in the limit of n approaching infinity converge to the coordinates $(x_f, y_f)$, for n being a number of iterations. Accordingly, a CORDIC algorithm as used herein, hereinafter referred to as "the CORDIC algorithm," may be summarized as indicated in Equation (3):

$$\begin{aligned} & i = 0 \\ & x_0 = x_s \\ & y_0 = y_s \\ & z_0 = \theta \\ & x_{i+1} = x_i - \sigma_i y_i 2^{-i} \\ & y_{i+1} = y_i - \sigma_i x_i 2^{-i} \\ & z_{i+1} = z_i - \sigma_i \tan^{-1}(2^{-i}) \\ & \sigma_i = \begin{cases} 1 & \text{if } z_i \geq 0 \\ -1 & \text{if } z_i < 0 \end{cases} \end{aligned} \quad (3)$$

Scaling is to be considered with respect to the CORDIC algorithm, as an input vector $(x_0, y_0)$ not only undergoes a rotation but also experiences scaling or growth by a factor of $1/\cos \alpha_i$ at each iteration. Thus, for each intermediate CORDIC iteration, as $(x_0, y_0)$ is translated to a final location $(x_f, y_f)$ there is a progressive growth. Notably, for $\sigma_i$ as defined in Equation (2), the scaling term $1/\cos \alpha_i$ is a constant, which is independent of the angle of rotation. Accordingly, a finite number of iterations, n, may be selected for implementing a CORDIC engine in software or hardware, or a combination thereof. Notably, for enhanced precision of an arithmetic implementation of the CORDIC algorithm, where each iteration contributes to one additional effective fractional bit to the result, double-precision floating-point calculations of the CORDIC algorithm may be used. An example application may be for the CORDIC algorithm in the vectoring mode in circular coordinates. However, for purposes of clarity, it shall be assumed that the CORDIC algorithm implemented to provide a CORDIC engine is realized using fixed-point arithmetic, even though it should be appreciated that floating-point arithmetic may be used for enhanced precision.

In the vectoring mode of the CORDIC algorithm, the initial vector $(x_0, y_0)$, is rotated until the y component or variable is driven to 0. To drive y to 0 involves a modification to the basic CORDIC algorithm, namely to direct iterations using the sign of $y_i$. As the y variable is reduced, the corresponding angle of rotation is accumulated. This accumulation may be accumulated in a register associated with the variable z, namely the z register. Thus, the complete CORDIC algorithm for vectoring as modified may be expressed as $$\begin{aligned} & i = 0 \\ & x_0 = x_s \\ & y_0 = y_s \\ & z_0 = 0 \\ & x_{i+1} = x_i - \sigma_i y_i 2^{-i} \\ & y_{i+1} = y_i - \sigma_i x_i 2^{-i} \\ & z_{i+1} = z_i - \sigma_i \tan^{-1}(2^{-i}) \\ & \sigma_i = \begin{cases} 1 & \text{if } y_i < 0 \\ -1 & \text{if } y_i \geq 0 \end{cases} \end{aligned} \quad (4)$$

This vectoring mode of the CORDIC algorithm may be referred to as the y-reduction mode. Notably, the CORDIC algorithm as described above with reference to Equation (3) may be referred to as the "z-reduction mode" due to the manner in which updates are directed.

To capture the vectoring and rotation modes of the CORDIC algorithm in all three coordinates systems using a single set of unified equations, a new variable, m, is introduced to identify the coordinate system being used. In this particular example, m is set to equal positive 1, 0, or negative 1, as follows:

$$m = \begin{cases} +1 & \text{circular coordinates} \\ 0 & \text{linear coordinates} \\ -1 & \text{hyperbolic coordinates} \end{cases} \quad (5)$$

The unified form of the CORDIC algorithm for the micro-rotation portion thereof with the introduction of variable m may be expressed as:

$$\begin{aligned} & x_{i+1} = x_i - m\sigma_i y_i 2^{-i} \\ & y_{i+1} = y_i - \sigma_i x_i 2^{-i} \\ & z_{i+1} = \begin{cases} z_i - \sigma_i \tan^{-1}(2^{-i}) & \text{if } m = 1 \\ z_i - \sigma_i \tanh^{-1}(2^{-i}) & \text{if } m = -1 \\ z_i - \sigma_i (2^{-i}) & \text{if } m = 0 \end{cases} \end{aligned} \quad (6)$$

For Equation (6), the scaling factor is:

$$K_{m,i} = (1 + m 2^{-2i})^{1/2}. \quad (7)$$

Accordingly, it should be appreciated that two modes, each with three coordinate systems, may be supported by a CORDIC engine. Notably, suitable initialization of algorithm variables may be used to generate the set of functions as illustratively shown in Table 1 below.

TABLE 1

| Coordinate System m | Rotation/ Vectoring | Initialization | Result Vector |
|---|---|---|---|
| 1 | Rotation | $x_0 = x_s$ $y_0 = y_s$ $z_0 = \theta$ | $x_n = K_{1,n} \cdot (x_s \cos\theta - y_s \sin\theta)$ $y_n = K_{1,n} \cdot (y_s \cos\theta + x_s \sin\theta)$ $z_n = 0$ |

TABLE 1-continued

| Coordinate System m | Rotation/ Vectoring | Initialization | Result Vector |
|---|---|---|---|
| 1 | | $x_0 = 1/K_{1,n}$<br>$y_0 = 0$<br>$z_0 = \theta$ | $x_n = \cos\theta$<br>$y_n = \sin\theta$<br>$z_n = 0$ |
| | Vectoring | $x_0 = x_s$<br>$y_0 = \theta$<br>$z_0 = z_s$ | $x_n = K_{1,n} \cdot \text{sgn}(x_0) \cdot (\sqrt{x^2+y^2})$<br>$y_n = 0$<br>$z_n = \theta + \tan^{-1}(y_s/x_s)$ |
| 0 | Rotation | $x_0 = x_s$<br>$y_0 = y_s$<br>$z_0 = z_s$ | $x_n = x_s$<br>$y_n = y_s + x_s y_s$<br>$z_n = 0$ |
| 0 | Vectoring | $x_0 = x_s$<br>$y_0 = y_s$<br>$z_0 = z_s$ | $x_n = x_s$<br>$y_n = 0$<br>$z_n = z_s + y_s/x_s$ |
| −1 | Rotation | $x_0 = x_s$<br>$y_0 = y_s$<br>$z_0 = \theta$ | $x_n = K_{-1,n} \cdot (x_s \cosh\theta + y_s \sinh\theta)$<br>$y_n = K_{-1,n} \cdot (y_s \cosh\theta + x_s \sinh\theta)$<br>$z_n = 0$ |
| | | $x_0 = 1/K_{-1,n}$<br>$y_0 = 0$<br>$z_0 = \theta$ | $x_n = \cosh\theta$<br>$y_n = \sinh\theta$<br>$z_n = 0$ |
| −1 | Vectoring | $x_0 = x_s$<br>$y_0 = y_s$<br>$z_0 = \theta$ | $x_n = K_{-1,n} \cdot \text{sgn}(x_0) \cdot (\sqrt{x^2-y^2})$<br>$y_n = 0$<br>$z_n = \theta + \tanh^{-1}(y_s/x_s)$ |

Table 1 indicates functions that may be computed by a CORDIC engine for circular (m=1), hyperbolic (m=−1), and linear (m=0) coordinate systems for vectoring and rotation modes. Notably, the third column indicates the initializations to be used to generate the resultant vectors as indicated in the fourth column.

Table 2 below summarizes shift sequences, maximum angle of convergence, namely $\theta_{Max}$, and scaling function for the three coordinate systems and the two modes of operation for the CORDIC engine associated with Table 1.

TABLE 2

| Coordinate System | Shift Sequence | Convergence | Scale Factor |
|---|---|---|---|
| m | $s_{m,i}$ | $\theta_{MAX}$ | $K_m$ (n → ∞) |
| 1 | 0, 1, 2, 3, 4, . . . , i, . . . | ≈1.74 | ≈1.64676 |
| 0 | 1, 2, 3, 4, 5, . . . , i + 1, . . . | 1.0 | 1.0 |
| −1 | 1, 2, 3, 4, 4, 5, . . . | ≈1.13 | ≈0.83816 |

Continuing the example of a fixed-point arithmetic implementation of a CORDIC engine, a user may indicate a specific numerical QoR. This QoR includes the number of fractional bits and the number of integer bits to be represented by each output. The fractional bits, $B_F$, are the bits to the right of a radix, namely the binary point, and the integer bits, $B_I$, are the bits to the left of the radix.

Figure 2:
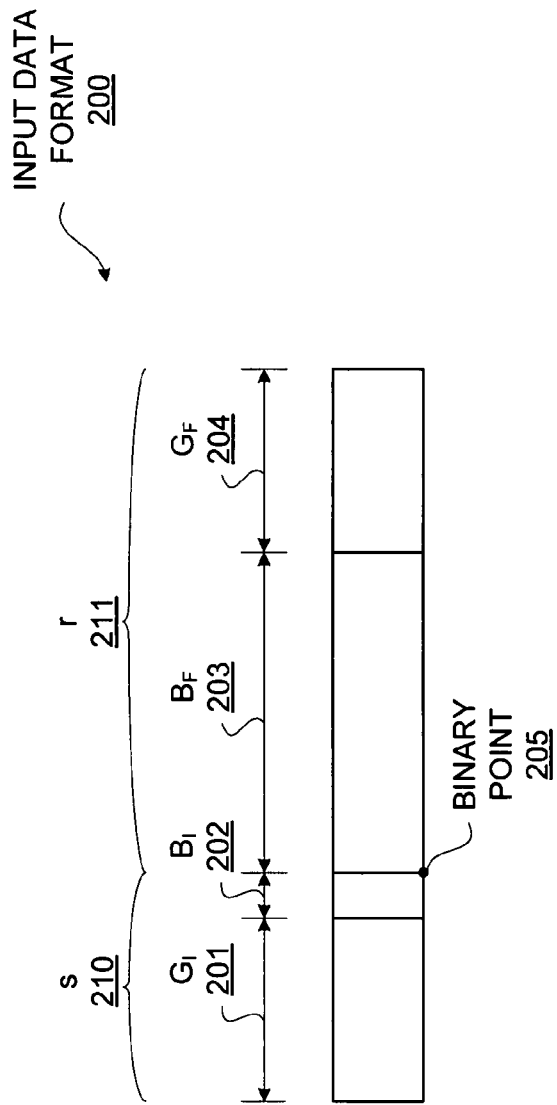
FIG. 2 is block diagram depicting an exemplary embodiment of an input data format.

FIG. 2 is block diagram depicting an exemplary embodiment of an input data format 200. More particularly, input data format 200 is an example of an extended data format, as it includes guard bits, where blocks of FIG. 2 generally indicate respective binary data fields as described below in additional detail. Generally, guard bits may be used to accommodate bit growth in one or both of the integer and fractional fields associated with variables of the CORDIC algorithm. For example, an x variable of the CORDIC algorithm may have an input data format 200 where integer bits ("$B_I$") 202 to the left of binary point 205 are specified and fractional bits ("$B_F$") 203 to the right of binary point 205 are specified. Added to input data format 200 may be guard bits, namely integer guard bits ("$G_I$") 201 and fractional guard bits ("$G_F$") 204.

Integer guard bits 201 are to accommodate vector growth experienced when operating, for example, using circular coordinates. Thus, integer guard bits 201 in addition to integer bits 202 are allocated to an integer field associated with input data. Fractional guard bits 204 may be used to support word growth that occurs in the fractional field associated with variables of the CORDIC algorithm due to successive arithmetic shift-right operations used in iterative updates. Generally, bit growth associated with CORDIC algorithm for integer and fractional fields is associated with the x and y variables, and not the z variable. Input data format 200 may be an integer/fractional fixed-point data format used for internal storage of quantizations of variables associated with a CORDIC engine.

Computational accuracy of an implementation of the CORDIC algorithm may be compromised by two primary noise sources, namely angle approximation and rounding error. The angle approximation error may be reduced to an arbitrarily small number by increasing the number of micro-rotations, namely the number of iterations n. The number of bits allocated to represent the elemental angles for such micro-rotations may be sufficient to support the smallest angle $\alpha_{m,n-1}$. For integer field ("s") 210 and fractional field ("r") 211, value of F, as defined below in Equation (8), of a normalized number representing a number of binary digits, where integer and fractional bit growth for x and y state variables of the CORDIC algorithm are supported, may be expressed as:

$$F = -r_{B_I+G_I-1} \cdot 2^{B_I+G_I-1} + \sum_{j=0}^{B_F+G_F-2} s_j \cdot 2^j \sum_{j=0}^{B_F+G_F-1} r_j \cdot 2^{-(B_F+G_F)+j}. \quad (8)$$

Notably, integer field 210 and fractional field 211 are respectively allocated $G_I+B_I$ and $G_F+B_F$ number of bits. For a fixed number of n rotation angles, $\alpha_{m,i}$ may be used to approximate a target angle of rotation θ. Ignoring all other error sources, the accuracy of the calculation may be generally governed by the final or nth rotation which limits the angle approximation error to $\alpha_{m,n-1}$. As indicated above, this error may be made arbitrarily small by using a sufficient number of micro-rotations n. Thus Equation (8) may represent a number for a least significant digit weighting of $2^{-(B_F+G_F)}$. Accordingly, approximately n+1 iterations may be used to generate $B_F$ significant fractional bits.

For the update of x, y, and z state variables of the CORDIC algorithm according to Equation (3), a dynamic range expansion may support register precisions accommodating a worst case bit growth. The number of additional guard bits beyond the original precision of the input operands may be impracticably large with respect to use of FPGA resources and operating clock frequency. In other words, a full-precision calculation for fixed-point arithmetic may involve more fractional guard bits than would be practical to implement. Accordingly, a less wide data path may be used with an acceptable data path rounding error using a substantially fewer number of fractional guard bits than used in a full-precision calculation.

In contrast to accommodating bit growth for an implementation of the CORDIC algorithm, dynamic range expansion may be handled by rounding each newly computed state variable before being returned to storage, such as storage in memory or registers. Control over word length may thus be achieved using unbiased rounding, simple truncation, or jamming. Notably, true rounding may be used to reduce the error caused by for example truncation, but true rounding may involve an impracticable increase in hardware or software overhead due to additional addition operations. In some applications, the overhead associated with rounding may be reduced by exploiting the carry-in port of adders used in the implementation, as is known.

As generally indicated above, data shifts are involved in updating the x and y state variables. Rounding error for the z state variable is less complex, as there are no data shifts involved. For the z state variable, rounding error is due to quantization of rotation angles. The upper bound on rounding error for the z state variable may then be based on accumulation of the absolute values of the rounding errors for the quantized angles $\alpha_{m,i}$. Data path reduction facilitated by rounding, and associated quantization effects, for the x and y state variables is made more complex due to the scaling termed involved in the cross-addition update. However, the effects of error propagation in the CORDIC algorithm associated with the x and y state variables may be handled as suggested by others.

For input data format 200 for each of the CORDIC state variables the maximum error for one iteration, as indicated above as being of magnitude $2^{-(B_F+G_F)}$, is the number of iterations, n, times this magnitude. If a user specifies $B_F$ fractional bits for a resulting word or output variable, then a resolution to achieve such QoR is $2^{-(B_F-1)}$. Selecting $B_F$ such that the data path rounding error is less than or equal to $2^{-B_F}$, data path quantization may be effectively ignored. In other words, the implication is that the data path rounding error is less than or equal to $2^{-B}_F$ which means that the number of fractional bits, $B_F$, is greater than or equal to the $\log_2$ of the number of iterations, n. Accordingly, the number of fractional guard bits, $G_F$, may be set equal to the $\log_2$ of the number of iterations n to produce a result having an accuracy of $B_F$ fractional bits, namely the targeted QoR for a resulting word.

The number of integer guard bits, $G_I$, may be defined based on the number of integer bits, $B_I$, in the input operands, the coordinate system to be used, and the mode to be used. For example, if the input data is a 2's complement format and bounded by $\pm 1$, then $B_I$ is equal to 1. This means that the $1^2$ norm of the input vector $(x_0,y_0)$ is $\sqrt{2}$ for the CORDIC vectoring mode, and the range extension introduced by the iterations is therefore approximately $K_1$, which is approximately equal to 1.6468 for a reasonable number of iterations. Accordingly, the maximum value of the final value of the x state variable may be assumed to be approximately $\sqrt{2} \times 1.6468$, which is approximately 2.3289. Accordingly, $G_I$ may be set equal to 2 or 3. For purposes of clarity by way of example and not limitation, it shall be assumed that $G_I$ is set equal to 2.

Figure 3:
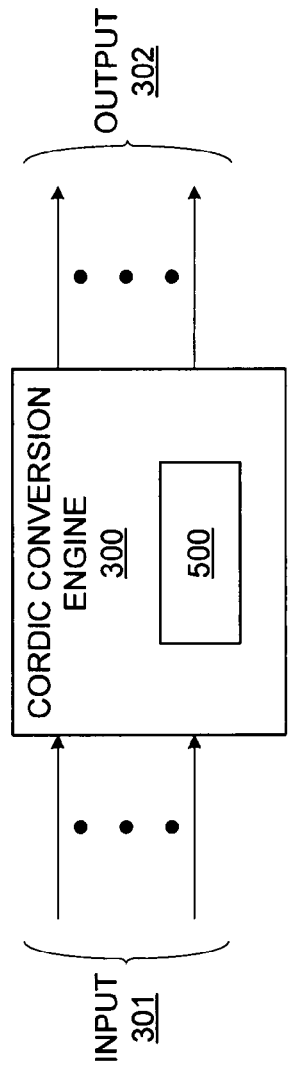
FIG. 3 is a block diagram depicting an exemplary embodiment of a COordinate Rotation DIgital Computer ("CORDIC") conversion engine.

FIG. 3 is a block diagram depicting an exemplary embodiment of a CORDIC conversion engine 300. CORDIC conversion engine 300 may be implemented in a digital processing system. CORDIC conversion engine 300 may include a CORDIC parameterization converter 500, which is described below in additional detail. CORDIC conversion engine 300 receives input 301. Input 301 may be a user-defined input for a target QoR as described above.

CORDIC conversion engine 300 provides output 302. Output 302 includes quantizations for the x, y, and z state variables, as applicable, dependent upon the mode and coordinate system selected. Furthermore, the number of iterations used to achieve quantizations of such state variables may be output as part of output 302.

Notably, it has been assumed that the QoR for each of the x, y, and z state variables of the CORDIC algorithm is generally the same. However, this is not necessarily so. For example, the fractional bit widths for each of the x, y, and z state variables may all be the same, may all be different, any two may be same with the third state variable integer and fractional bit widths being different from the other two. Likewise, it is not necessary that the integer bit widths all be the same for example. Thus, more specifically, the integer and fractional bits for each of the x, y, and z state variables may be respectively described by the sets of $(B_{Ix}, B_{Fx})$, $(B_{Iy}, B_{Fy})$, and $(B_{Iz}, B_{Fz})$. Moreover, there may a same or different number of iterations for x, y, and z state variables, such as $n_x$, $n_y$, and $n_z$. However, as indicated above, the integer guard bits $G_I$ may be set to a number which effectively encompasses a reasonable number of iterations, which in this example is set equal to 2 bits.

The number of fractional guard bits, $G_F$, is dependent on the number of iterations, which as described below in additional detail is dependent on the number fractional data bits, which may vary among state variables. However, for purposes of clarity by way of example and not limitation, the general case for selecting field widths for x, y, and z state variables is described below, as the particular case for the QoR for each of such state variables shall be understood from the general case described below. Thus, it shall be assumed that the same bit widths and number of iterations are used for x, y, and z state variables, unless otherwise indicated.

Figure 4:
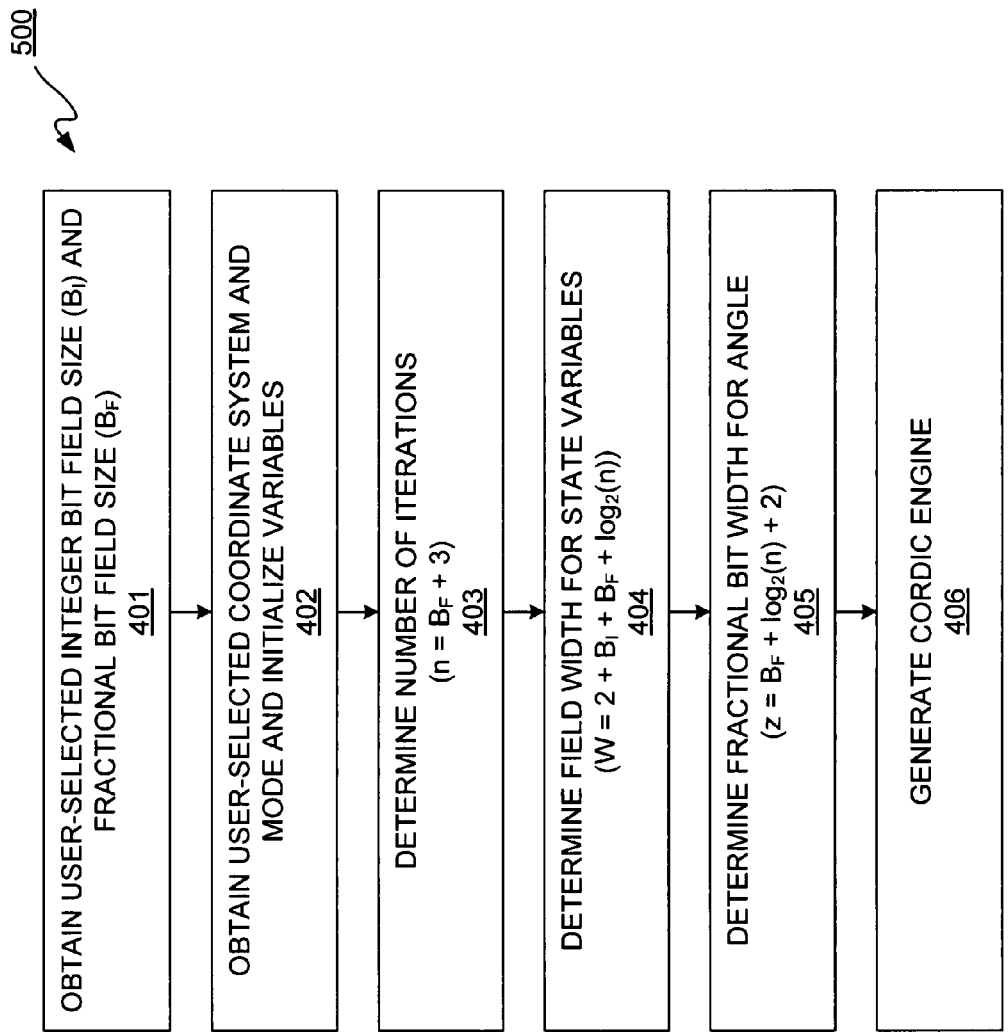
FIG. 4 is a flow diagram depicting an exemplary embodiment of a CORDIC parameterization routine.

FIG. 4 is a flow diagram depicting an exemplary embodiment of a CORDIC parameterization routine 500. At 401, a user-selected integer bit field size, $B_I$, and a user-selected fractional bit field size, $B_F$, for a targeted QoR are obtained. This information may be obtained via a user interface associated with an implementation of routine 500.

At 402, a user-selected coordinate system and a user-selected mode are obtained for routine 500. Again, the user may select the coordinate system and the mode via, for example, pull-down menus provided via a user interface. Furthermore, at 402, responsive to the coordinate system and mode selected by the user, state variables associated with the CORDIC algorithm are initialized.

Figure 5:
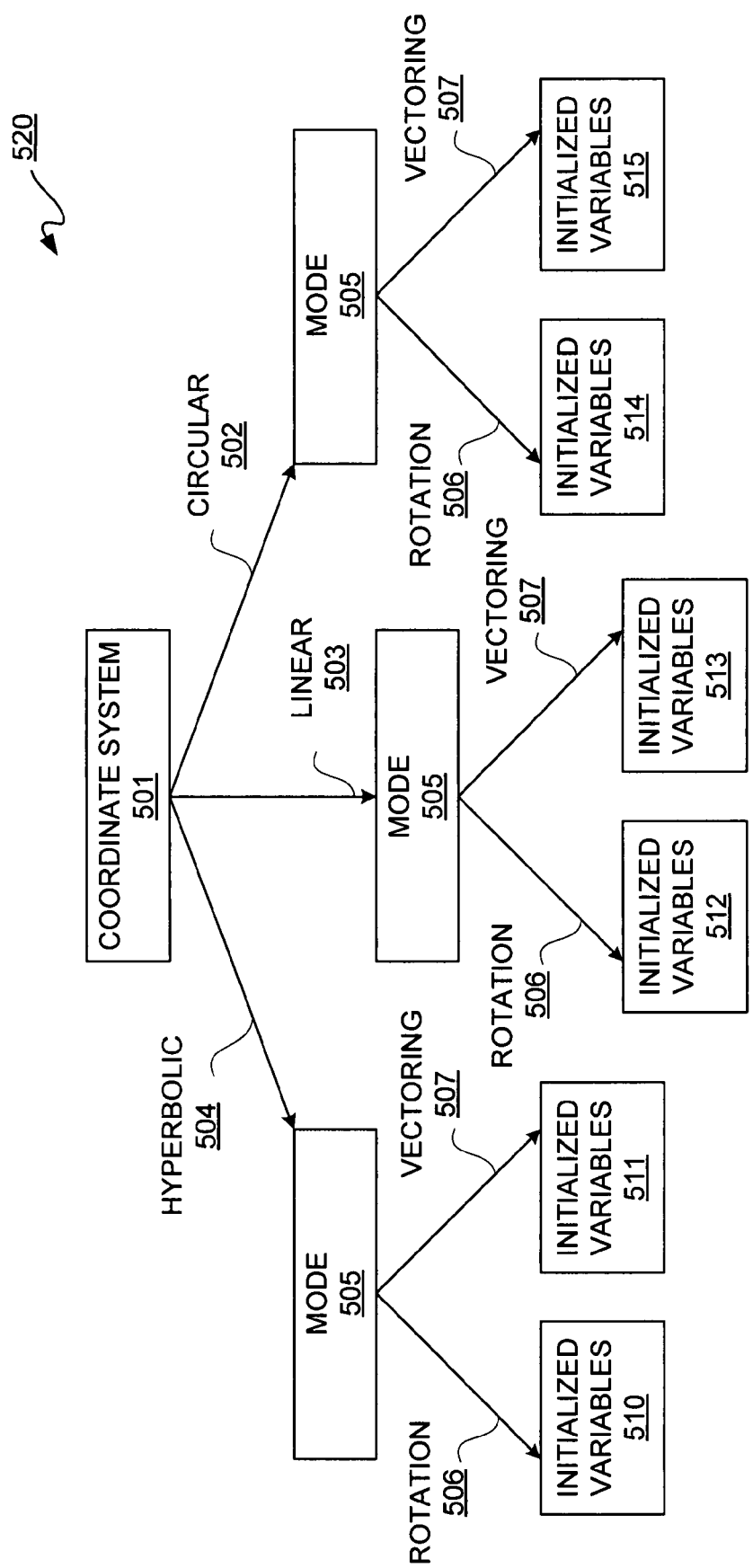
FIG. 5 is a tree diagram depicting an exemplary embodiment of a data structure which may be part of variable initialization performed as part of the CORDIC parameterization routine of FIG. 4.

FIG. 5 is a tree diagram depicting an exemplary embodiment of a data structure 520 which may be part of variable initialization at 402 of routine 500. At 501, a coordinate system is selected. The choices may be hyperbolic as indicated by branch 504, linear as indicated by branch 503, or circular as indicated by branch 502. After a coordinate system is selected, a mode may be selected, as indicated by mode blocks 505. Each mode block 505 may be the same, namely for selecting either a rotation or a vectoring mode as respectively indicated by branches 506 and 507. However, depending on the series of choices by which mode block 505 is arrived at, namely whether via branch 502, 503, or 504, a different set of initialized variables may be obtained. Thus, for a hyperbolic coordinate system, for a rotation mode initialized variables 510 are obtained, and for a vectoring mode initialized variables 511 are obtained. For a linear coordinate system, for a rotation mode initialized variables 512 are selected, and for a vectoring mode initialized variables 513 are selected. Lastly, for a circular coordinate system, for a rotation mode initialized variables 514 are selected, and for a vectoring mode initialized variables 515 are selected. Notably, initialized variables 510 through 515 for the respective modes and coordinate systems are broken out in the third column of Table 1 above. More particularly, initialized variables 514 are in the third column, first row; initialized variables 515 are in the third column, second row; initialized variables 512 are in the third column, third row; initialized variables 513 are in the third column, fourth row; initialized variables 510 are in the third column, fifth row; and initialized variables 511 are in the third column, sixth row.

Returning to FIG. 4, at 403, a number of iterations is determined. The number of iterations, n, is set equal to the fractional bit width for the target output obtained at 401 plus 3. Notably, the number of iterations is the same regardless of mode or coordinate system selected. However, the field widths for the state variables may vary depending upon the coordinate system and mode selected. Thus, for purposes of clarity by way of example and not limitation, it shall be assumed that the remainder of routine 500 is for the vectoring mode in a circular coordinate system.

At 404, the field widths for the x and y state variables of the CORDIC algorithm are determined. These field widths include both the integer bits widths and the fractional bits widths for both the data bits as well as for the guard bits. Width W is equal to $2+B_I+B_F+\log_2(n)$. $\log_2(n)$ is the number of fractional guard bits for n iterations, which number of iterations is determined at 403 as described above. The number of fractional bits, $B_F$, and the number of integer bits, $B_I$, are obtained at 401 from user input. In other words, the fractional and integer bit widths used at 404 are for the user-defined QoR for each of the x and y state variables. Again, it should be appreciated that x and y need not have the same bit widths, and thus different bit widths may be used as between these two state variables.

The number 2 in the equation for field width W is the integer guard bits, $G_I$, as indicated above for this example. Thus the bits associated with $B_F+\log_2(n)$ may be allocated to the fractional component of the x and y registers respectively associated with the x and y state variables, and the bits associated with $2+B_I$ may be associated with the integer component of the x and y registers respectively associated with the x and y state variables. Notably, though registers are illustratively described herein, it should be appreciated that other circuit devices known for storing information may be used. Furthermore, it should be appreciated that separate sets of registers may be used for the integer and fractional components.

At 405, the fractional bit width for the angle, namely for the z state variable for this example, is set equal to $B_F+\log_2(n)+2$. The fractional bit width, $B_F$, for the z state variable is obtained at 401, as previously described. The $\log_2(n)+2$, for n as determined at 403, is the number of fractional guard bits. For the vectoring mode in a circular coordinate system, a single bit may be used for the integer portion of the z register.

At 406, a CORDIC engine is generated responsive to the bit widths determined at 404 and 405, as well as the number of iterations determined at 403. Accordingly, there may be an n register, an x register, a y register, and a z register. It should be appreciated that in some instances because multiple bits are being discussed, and thus the term "register" is meant to include one or more circuits used to implement such a register, such as one or more flip-flops. Notably, from the above example, it should be understood that any combination of the above-mentioned coordinate systems and modes may be used.

It should be appreciated that the CORDIC engine generated at 406 may be implemented in hardware or software. With respect to hardware, the CORDIC engine generated at 406 may be implemented using programmable logic. Accordingly, a core may be provided in accordance with the parameters determined using routine 500 to instantiate a CORDIC engine in accordance therewith in programmable logic. Referring back to FIG. 3, it should be appreciated therefore that output 302 may be stored in a table, and thus various parameters provided via input 301 may be used to generate various CORDIC engines for storage for subsequent access.

Figure 6:
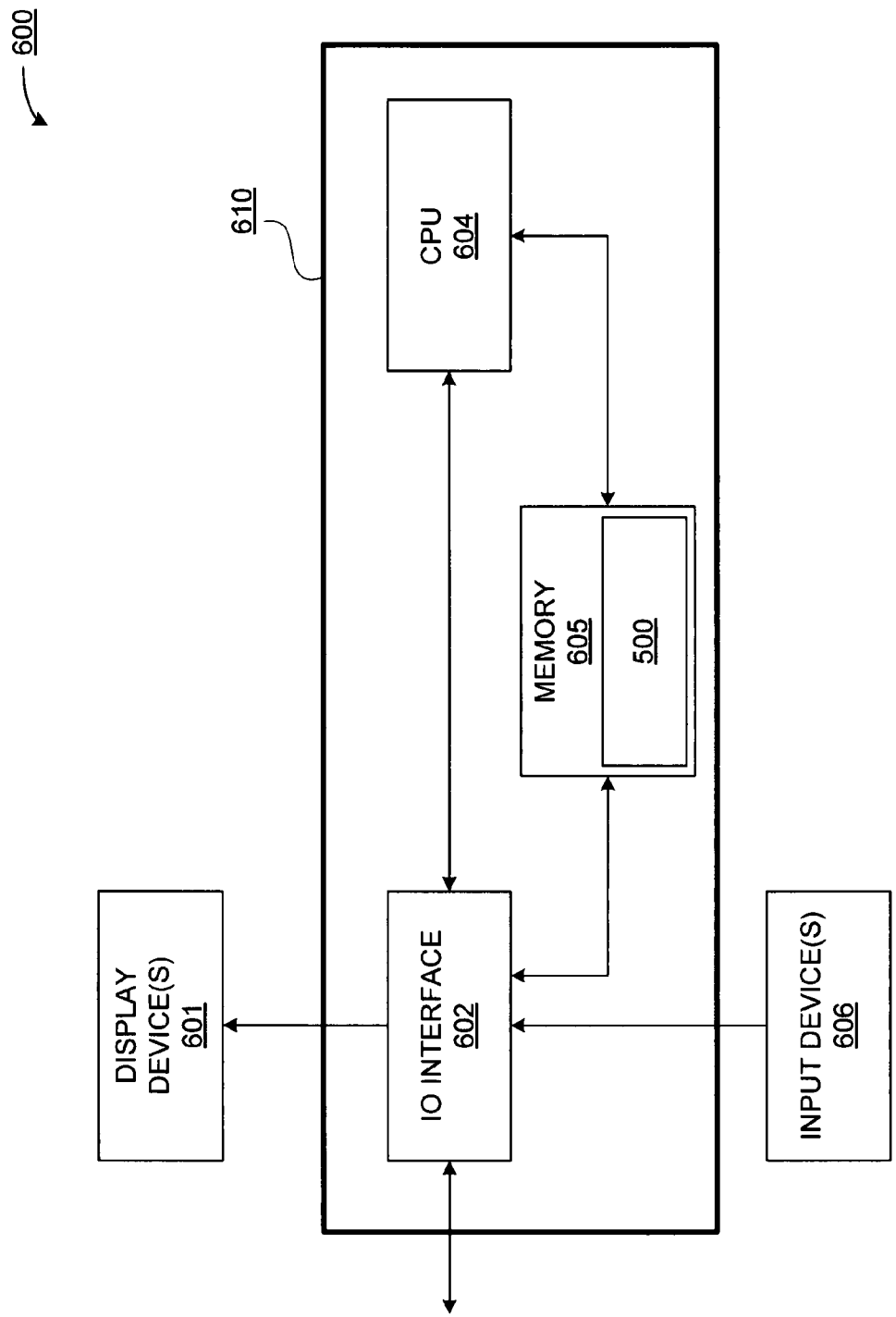
FIG. 6 is a high-level block diagram of an exemplary embodiment of a computer system.

FIG. 6 is a high-level block diagram of an exemplary embodiment of a computer system 600. Computer system 600 may include a programmed computer 610 coupled to one or more display devices 601, such as Cathode Ray Tube ("CRT") displays, Plasma displays, Liquid Crystal Displays ("LCD"), and to one or more input devices 606, such as a keyboard and a cursor pointing device. Other known configurations of a computer system may be used.

Programmed computer 610 may be programmed with a known operating system, which may be Mac OS, Java Virtual Machine, Linux, Solaris, UNIX, or a Windows operating system, among other known platforms. Programmed computer 610 includes a central processing unit (CPU) 604, memory 605, and an input/output ("IO") interface 602. CPU 604 may be a type of microprocessor known in the art, such as available from IBM, Intel, and Advanced Micro Devices for example. Support circuits (not shown) may include conventional cache, power supplies, clock circuits, data registers, and the like. Memory 605 may be directly coupled to CPU 604 or coupled through IO interface 602. At least a portion of an operating system may be disposed in memory 605. Memory 605 may include one or more of the following: random access memory, read only memory, magneto-resistive read/write memory, optical read/write memory, cache memory, magnetic read/write memory, and the like, as well as signal-bearing media as described below.

IO interface 602 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, IO interface 602 may be coupled to a conventional keyboard, network, mouse, display printer, and interface circuitry adapted to receive and transmit data, such as data files and the like. Notably, programmed computer 610 may be coupled to a number of client computers, server computers, or any combination thereof via a conventional network infrastructure, such as a company's Intranet and/or the Internet, for example, allowing distributed use for interface generation.

Memory 605 may store all or portions of one or more programs or data to implement processes in accordance with one or more aspects of the invention to provide routine 500 of FIG. 5. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of routine 500, as well as documents thereof, may define functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Furthermore, such signal-bearing media may be in the form of a carrier wave or other signal propagation medium via a communication link for streaming information, including downloading all or a portion of a computer program product. Such signal-bearing media, when carrying computer-readable instructions that direct functions of one or more aspects of the invention, represent embodiments of the invention.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method in a digital processing system for generation of a COordinate Rotation Digital Computer (CORDIC) engine, comprising:
    obtaining a number of fractional output bits for a user-defined numerical result format for each output variable of a plurality of output variables associated with a CORDIC algorithm, wherein the number of fractional output bits for at least two output variables of the plurality of output variable are different;
    defining a number of iterations for each output variable of the plurality of output variables as a function of the number of fractional output bits for that respective output variable, wherein the number of iterations for each output variable of the plurality of output variables is defined to be equal to a same constant plus the number of fractional output bits for that respective output variable, wherein the numbers of iterations for the at least two output variables are different;
    determining, using an integrated circuit implementing the digital processing system that includes a CORDIC conversion engine, quantizations associated with each output variable of the plurality of output variables responsive at least in part to the number of fractional output bits for that respective output variable, and to the number of iterations for that respective output variable, and
    outputting the plurality of output variables based on the numbers of iterations and the quantizations.

2. The method according to claim 1, further comprising:
    obtaining a coordinate system selection for the CORDIC algorithm; and
    obtaining a mode selection for the coordinate system selection for the CORDIC algorithm.

3. The method according to claim 1, wherein:
    the plurality of output variables associated with the CORDIC algorithm includes an x variable.

4. The method according to claim 3, wherein:
    the quantizations are field widths; and
    a fractional field width portion of the field widths for the x variable is equal to the number of fractional output bits for the x variable plus log base 2 of the number of iterations for the x variable.

5. The method according to claim 4, wherein:
    the log base 2 of the number of iterations for the x variable is for at least one fractional guard bit for the fractional field width portion of the field widths for the x variable.

6. The method according to claim 1, wherein the plurality of output variables associated with the CORDIC algorithm includes a y variable.

7. The method according to claim 6, wherein:
    the quantizations are field widths; and
    a fractional field width portion of the field widths for the y variable is equal to the number of fractional output bits for the y variable plus log base 2 of the number of iterations for the y variable.

8. The method according to claim 1, wherein the plurality of output variables associated with the CORDIC algorithm includes a z variable.

9. The method according to claim 8, wherein:
    the quantizations are field widths; and
    a fractional field width portion of the field widths for the z variable is equal to 2 plus the number of fractional output bits for the z variable plus log base 2 of the number of iterations for the z variable.

10. The method according to claim 1, further comprising:
    obtaining a number of integer output bits for the user-defined numerical result format for each output variable of the plurality of output variables;
    wherein the quantizations for each output variable of the plurality of output variables are determined responsive in part to the number of integer output bits for that respective output variable.

11. The method according to claim 10, wherein the plurality of output variables includes an x variable, and an integer field width portion for the x variable is equal to the number of integer output bits for the x variable plus 2.

12. The method according to claim 10, wherein the plurality of output variables includes a y variable, and an integer field width portion for the y variable is equal to the number of integer output bits for the y variable plus 2.

13. The method according to claim 10, wherein the plurality of output variables includes a z variable, and an integer field width portion for the z variable is set equal to 1.

14. The method according to claim 10, further comprising:
    using the quantizations associated with each output variable of the plurality of output variables for instantiation of x variable register bits, y variable register bits, and z variable register bits respectively associated with an x variable, a y variable, and a z variable; and
    using the numbers of iterations for at least one output variable of the plurality of output variables for instantiation of at least one set of iteration register bits.

15. The method according to claim 1, wherein the same constant is 3 regardless of the number of fractional output bits.

16. A non-transitory machine-readable medium having stored thereon information representing instructions that, when executed by a processor, cause the processor to perform operations comprising:
    obtaining a number of fractional output bits for a user-defined numerical result format for each output variable of a plurality of output variables associated with a COordinate Rotation Digital Computer (CORDIC) algorithm, wherein the number of fractional output bits for at least two output variables of the plurality of output variable are different;
    defining a number of iterations for each output variable of the plurality of output variables as a function of the number of fractional output bits for that respective output variable, wherein the number of iterations for each output variable of the plurality of output variables is defined to be equal to a same constant plus the number of fractional output bits for that respective output variable, wherein the numbers of iterations for the at least two output variables are different;
    determining quantizations associated with each output variable of the plurality of output variables responsive at least in part to the number of fractional output bits for that respective output variable, and to the number of iterations for that respective output variable, and outputting the plurality of output variables based on the numbers of iterations and the quantizations.

17. A CORDIC conversion engine, comprising:

an integrated circuit implementing a CORDIC parameterization converter;

wherein the integrated circuit is configured for obtaining a number of fractional output bits for a user-defined numerical result format for each output variable of a plurality of output variables, wherein the number of fractional output bits for at least two output variables of the plurality of output variable are different;

wherein the integrated circuit is also configured for defining a number of iterations for each output variable of the plurality of output variables as a function of the number of fractional output bits for that respective output variable, wherein the function comprises adding a same constant to the number of fractional output bits for each output variable of the plurality of output variables, wherein the numbers of iterations for the at least two output variables are different;

wherein the integrated circuit is also configured for determining quantizations associated with each output variable of the plurality of output variables responsive at least in part to the number of fractional output bits for that respective output variable and to the number of iterations for that respective output variable, and outputting the plurality of output variables based on the numbers of iterations and the quantizations.

18. The CORDIC conversion engine of claim 17, wherein:

the plurality of output variables includes an x variable;

the quantizations are field widths; and a fractional field width portion of the field widths for the x variable is equal to the number of fractional output bits for the x variable plus log base 2 of the number of iterations for the x variable.

19. The CORDIC conversion engine of claim 17, wherein the integrated circuit is further configured for obtaining a number of integer output bits for the user-defined numerical result format for each output variable of the plurality of output variable;

wherein the integrated circuit is configured for determining the quantizations for each output variable of the plurality of output variables responsive in part to the number of integer output bits for that respective output variable.

20. The CORDIC conversion engine of claim 19, wherein the plurality of output variables includes an x variable, and an integer field width portion for the x variable is equal to the number of integer output bits for the x variable plus 2.

* * * * *